United States Patent
Flynn et al.

(10) Patent No.: US 9,603,117 B2
(45) Date of Patent: Mar. 21, 2017

(54) NETWORK INFRASTRUCTURE IDENTIFICATION

(71) Applicant: Apple Inc., Cupertino, CA (US)

(72) Inventors: Paul V. Flynn, Menlo Park, CA (US); Rafael L. Rivera-Barreto, Santa Clara, CA (US); Sreevalsan Vallath, Dublin, CA (US); Francisco J. Gonzalez, San Jose, CA (US)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 14/499,099

(22) Filed: Sep. 27, 2014

(65) Prior Publication Data
US 2015/0237615 A1    Aug. 20, 2015

Related U.S. Application Data

(60) Provisional application No. 61/941,554, filed on Feb. 19, 2014.

(51) Int. Cl.
*H04M 3/00* (2006.01)
*H04W 64/00* (2009.01)
*H04W 48/04* (2009.01)

(52) U.S. Cl.
CPC ........... *H04W 64/00* (2013.01); *H04W 48/04* (2013.01); *H04W 64/003* (2013.01)

(58) Field of Classification Search
CPC ............................. H04W 64/00; H04W 64/003
USPC ........................... 455/418, 456.1–456.5, 447
See application file for complete search history.

(56) References Cited

U.S. PATENT DOCUMENTS

| | | | | |
|---|---|---|---|---|
| 5,570,412 A | * | 10/1996 | LeBlanc | H04W 64/00 455/456.2 |
| 6,038,455 A | * | 3/2000 | Gardner | H04B 7/2615 370/337 |
| 6,522,888 B1 | * | 2/2003 | Garceran | H04W 16/18 455/423 |
| 7,123,928 B2 | * | 10/2006 | Moeglein | G01S 5/0236 455/404.2 |
| 7,821,449 B2 | * | 10/2010 | Sheynblat | G01S 5/0236 342/357.2 |

(Continued)

FOREIGN PATENT DOCUMENTS

KR            101222617            1/2013

*Primary Examiner* — Charles Shedrick
(74) *Attorney, Agent, or Firm* — Meyertons Hood Kivlin Kowert & Goetzel, P.C.; Jeffrey C. Hood

(57) ABSTRACT

This disclosure relates to network infrastructure identification by a wireless user equipment (UE) device. According to one embodiment, one or more requests for infrastructure identification information may be transmitted. Each request may indicate a current location of the UE. A respective response may be received to each corresponding respective request. Each respective response may include infrastructure identification information for the current location indicated in the corresponding respective request. Features such as vendor, type, model, or version of cellular network infrastructure equipment with which the UE performs cellular communication may be identified based on the response(s), and features specific to the identified equipment may accordingly be implemented during such cellular communication.

19 Claims, 4 Drawing Sheets

(56) References Cited

U.S. PATENT DOCUMENTS

| | | | |
|---|---|---|---|
| 8,467,795 B2* | 6/2013 | Li | H04W 4/02 455/445 |
| 2002/0168985 A1* | 11/2002 | Zhao | G01S 19/05 455/456.1 |
| 2004/0259570 A1* | 12/2004 | Wan | H04W 64/00 455/456.1 |
| 2007/0077945 A1* | 4/2007 | Sheynblat | G01S 5/0036 455/456.5 |
| 2011/0021234 A1* | 1/2011 | Tibbitts | H04W 48/04 455/517 |
| 2011/0151898 A1* | 6/2011 | Chandra | H04W 4/02 455/466 |
| 2012/0040689 A1* | 2/2012 | Gaal | G01S 19/25 455/456.1 |
| 2014/0274113 A1* | 9/2014 | Teed-Gillen | H04W 64/00 455/456.1 |
| 2014/0324630 A1* | 10/2014 | Golden | G06Q 30/0623 705/26.61 |
| 2015/0133152 A1* | 5/2015 | Edge | G01S 5/0236 455/456.1 |

\* cited by examiner

NETWORK INFRASTRUCTURE IDENTIFICATION

PRIORITY CLAIM

The present application claims benefit of priority to U.S. Provisional Application No. 61/941,554 titled "Network Infrastructure Identification" and filed on Feb. 19, 2014, which is hereby incorporated by reference in its entirety as though fully and completely set forth herein.

FIELD

The present application relates to wireless devices, and more particularly to a system and method for wireless devices to identify network infrastructure equipment.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Wireless communication systems generally rely on various network infrastructure equipment to provide wireless communication capabilities. Various differences may exist between different network infrastructure equipment, such as differences in infrastructure equipment vendor, type/model, version, etc.

SUMMARY

Embodiments are presented herein of methods for wireless devices to identify network infrastructure equipment with which they are communicating and/or of which they are in the vicinity, and of devices configured to implement the methods.

According to the techniques described herein, a wireless device may query a network infrastructure vendor's server for information regarding whether or not any network infrastructure provided by that vendor serves the current location of the wireless device. If the infrastructure vendor doesn't have any equipment serving that location, the network infrastructure vendor's server may respond to the query indicating as much. If the infrastructure vendor does have any equipment serving that location, the network infrastructure vendor's server may respond to the query indicating identification information for any of the vendor's equipment which services that location.

As a further possibility, a wireless device may query a cellular network operator's server for information regarding the network infrastructure deployed at or near the current location of the wireless device. If the cellular network operator doesn't have any cellular network infrastructure equipment serving that location, the cellular network operator's server may respond to the query indicating as much. If the network operator does have any equipment serving that location, the network operator's server may respond to the query indicating identification information for any of the operator's equipment which services that location The wireless device may query multiple servers in some cases. Based on the response(s), the wireless device may be able to determine the vendor, network element type, version identifier, and/or other information regarding the network infrastructure equipment with which the wireless device is communicating at that time/in that location. The wireless device may modify its behavior based on the information obtained, e.g., to implement features and/or behaviors specific to the network infrastructure equipment with which it is communicating.

Furthermore, the wireless device may provide some or all of the information obtained by querying infrastructure vendors' and/or network operators' servers to a server provided by a vendor of the wireless device. The device vendor's server(s) may compile such information for various locations (which may be obtained from multiple different wireless devices tasked by the wireless device vendor to obtain such information). Once such data has been compiled, wireless devices produced by that vendor may be able to query the wireless device vendor's server for network infrastructure equipment identification information rather than the network infrastructure vendor(s)'s servers, e.g., for convenience and/or to limit the load on the infrastructure vendor(s)'s and network operator(s)'s servers.

The techniques described herein may be implemented in and/or used with a number of different types of devices, including but not limited to cellular phones, tablet computers, wearable computing devices, portable media players, cellular network infrastructure equipment, servers, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
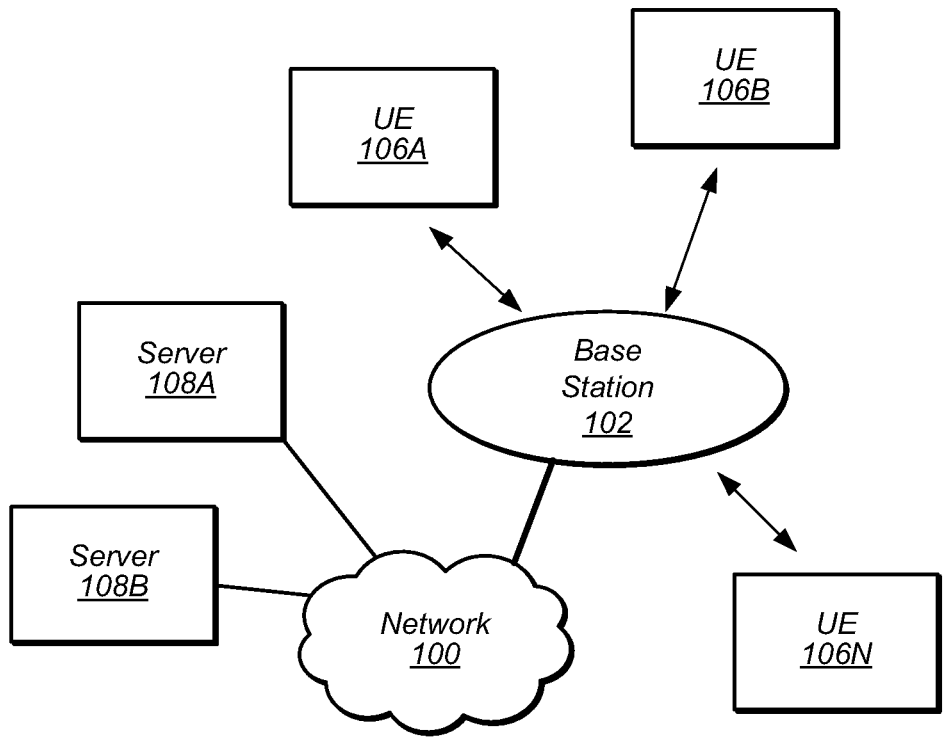
FIG. 1 illustrates an exemplary (and simplified) wireless communication system, according to one embodiment.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
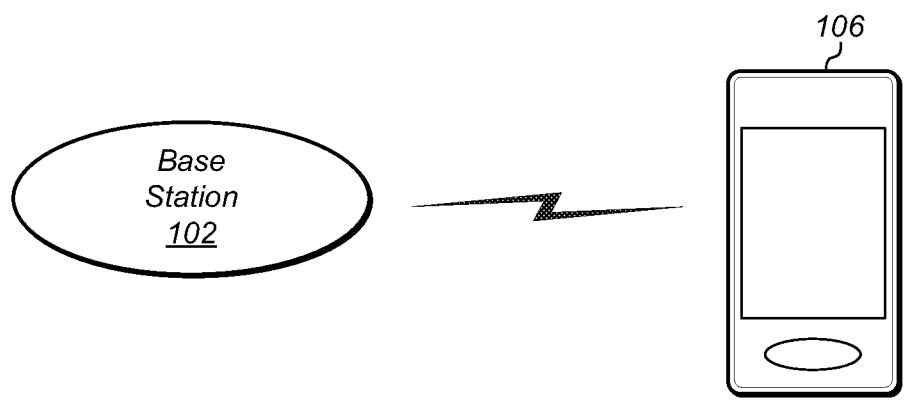
FIG. 2 illustrates a base station (BS) in communication with a user equipment (UE) device, according to one embodiment.

FIGS. 1 and 2—Communication System

FIG. 1 illustrates an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. If the base station 102 is implemented in the context of LTE, it may alternately be referred to as an 'eNodeB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The network 100 may provide a communication link to one or more servers 108 (e.g., server 108A, server 108B) to the UEs 106 (e.g., by way of base station 102). The servers 108 (individually or collectively) may provide any of a variety of services to the UEs 106. For example, a server 108 might provide a database including any of various types of information which a UE 106 may query to access the information, a cloud based service such as a media streaming service, an intelligent personal assistant service, or a mapping service, an email server, or any of various other functions. As one specific possibility, a server 108 may store cellular network infrastructure equipment deployment information for a particular infrastructure vendor (e.g., if operated by that infrastructure vendor) or for multiple infrastructure vendors (e.g., if operated by a device vendor or cellular network operator which has aggregated such information) in conjunction with one or more cellular network operators, such as further described herein with respect to FIG. 6.

Note that while a communication link between the UEs 106 and the servers 108 by way of the base station 102 and the network 100 represents one possible such communication link, it may also or alternatively be possible to provide such a link by other means. For example, the UEs 106 might be capable of communicating with one or more Wi-Fi access points which provide access to the network 100 or another network which is communicatively coupled to one or more of the servers 108. Additionally, one or more intermediary devices or networks in addition to or as alternatives to those shown may be part of the communication link, if desired.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS, WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

A variety of possible cellular network infrastructure components may be used to implement a cellular communication system. For example, different types of cellular network infrastructure components may be used to provide different aspects (e.g., macro base stations, micro base stations, mobile management entities and other core network entities, among various possible aspects) of a cellular network's functionality; different equipment vendors may provide competing equipment solutions for a specific purpose (e.g., macro base station solutions, as one possibility) in a cellular network; and/or a specific piece of cellular network infrastructure equipment may occasionally be modified or updated (e.g., to run a new software version). Such different cellular network infrastructure components may behave (subtly or overtly) in different ways which may affect the optimal manner in which UEs 106 perform cellular communication with those components, even if the various possible cellular network infrastructure components are compliant with the same cellular communication standard(s).

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102, according to one embodiment. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
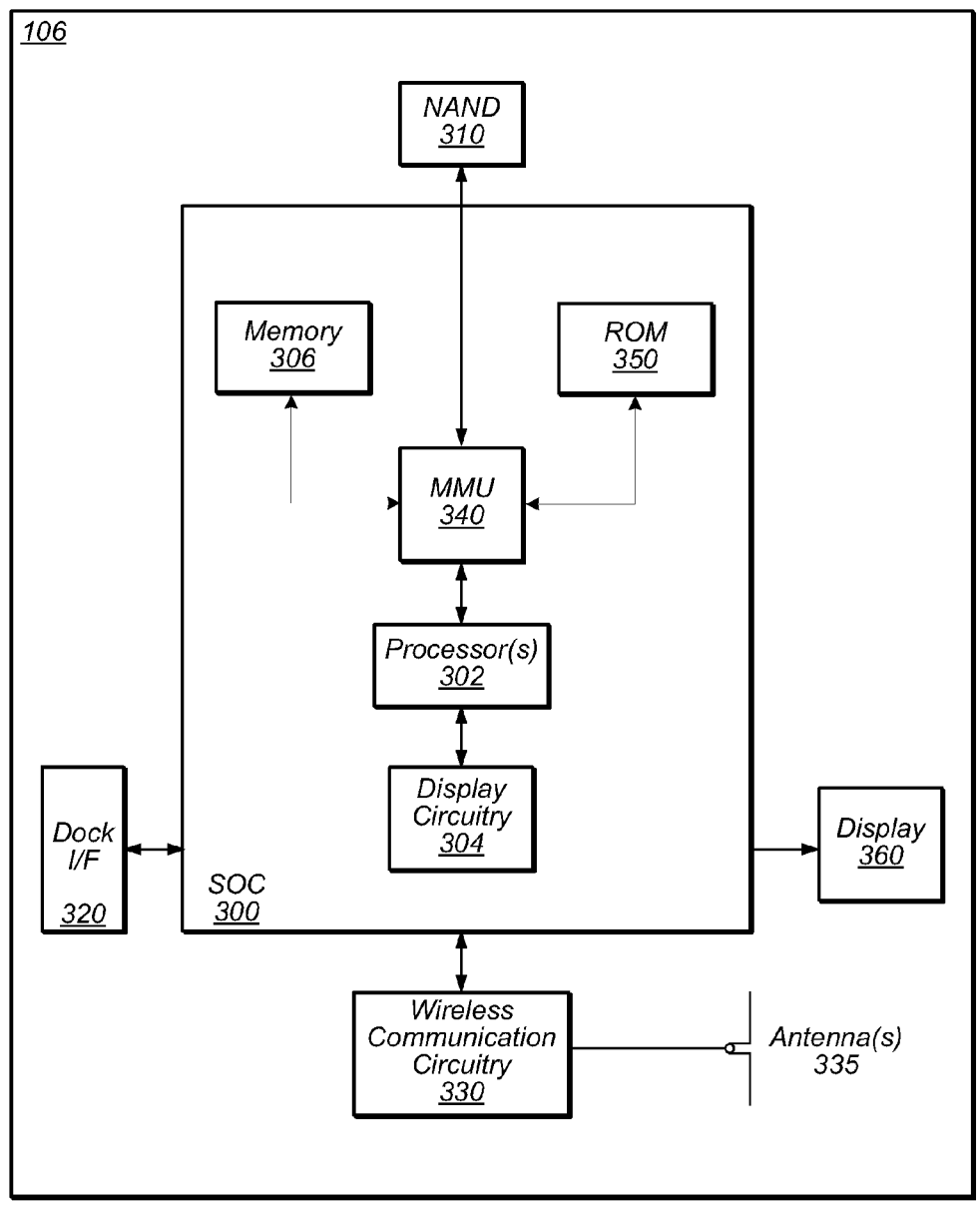
FIG. 3 illustrates an exemplary block diagram of a UE, according to one embodiment.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication standards in some embodiments.

As described further subsequently herein, the UE 106 may include hardware and software components for implementing features for identifying cellular network infrastructure equipment, such as those described herein with reference to, inter alia, FIG. 6. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 6.

Figure 4:
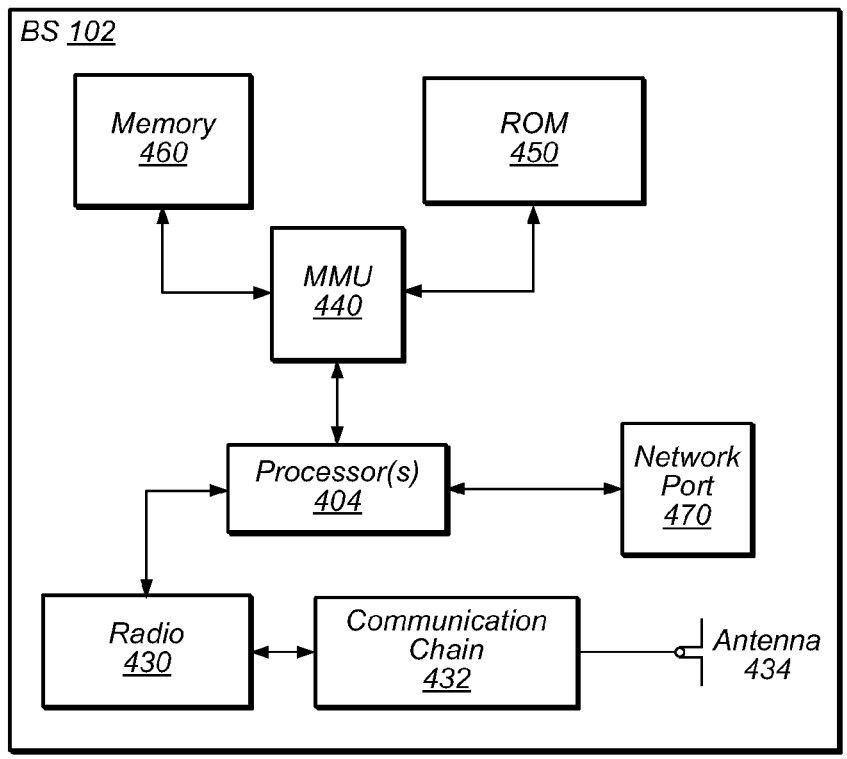
FIG. 4 illustrates an exemplary block diagram of a BS, according to one embodiment.

FIG. 4—Exemplary Block Diagram of a Base Station

FIG. 4 illustrates an exemplary block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing features supporting identification of cellular network infrastructure equipment (such as the BS 102) by a wireless user equipment device (such as UE 106 illustrated in FIGS. 1-3), such as those described herein with reference to, inter alia, FIG. 6. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein, such as the features described herein with reference to, inter alia, FIG. 6.

Figure 5:
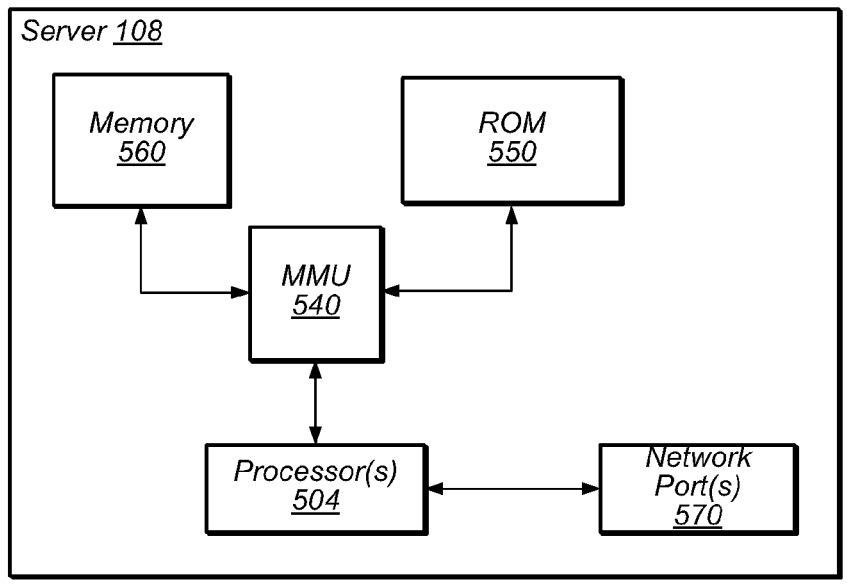
FIG. 5 illustrates an exemplary block diagram of a server computer system, according to one embodiment.

FIG. 5—Exemplary Block Diagram of a Base Station

FIG. 5 illustrates an exemplary block diagram of a server computer 108, according to one embodiment. It is noted that the server of FIG. 5 is merely one example of a possible server 108. As shown, the server 108 may include processor(s) 504 which may execute program instructions for the server 108. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The server 108 may include at least one network port 570. The network port(s) 570 may include wired and/or wireless ports, and may be configured to couple to any of various networks and/or network elements, including one or more local networks, intranets, cellular core networks, public switched telephone networks, and/or the Internet, among various possibilities.

Figure 6:
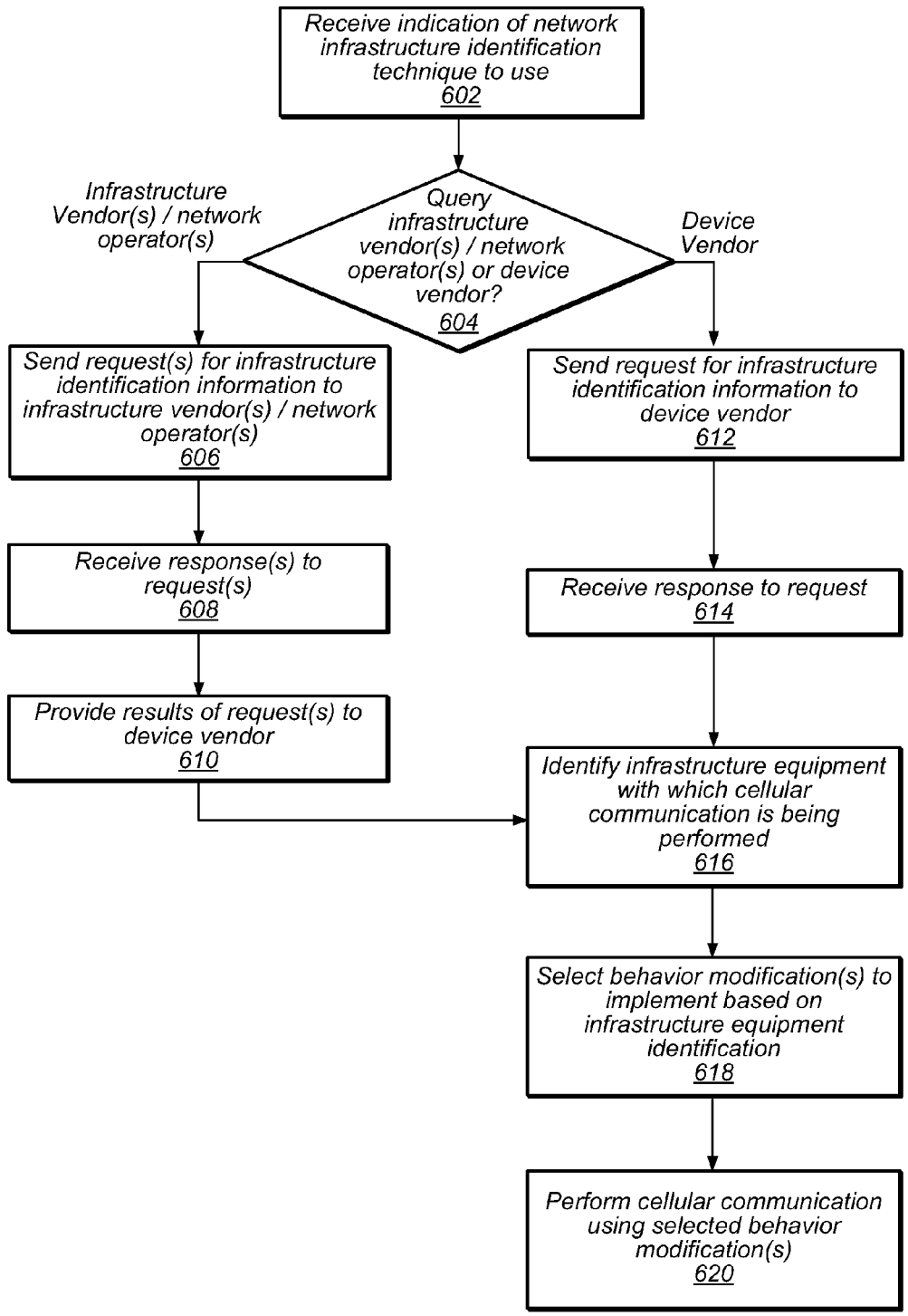
FIG. 6 is a flowchart diagram illustrating an exemplary method for identifying cellular network infrastructure equipment, according to one embodiment.

The server 108 may include hardware and software components for implementing features supporting identification of cellular network infrastructure equipment by a wireless user equipment device (such as UE 106 illustrated in FIGS. 1-3), such as those described herein with reference to, inter alia, FIG. 6. The processor 504 of the server 108 may be configured to implement or support implementation of part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof. Alternatively (or in addition) the processor 504 of the server 108, in conjunction with one or more of the other components 540, 550, 560, 570 may be configured to implement or support implementation of part or all of the features described herein, such as the features described herein with reference to, inter alia, FIG. 6.

FIG. 6—Flowchart Diagram

As previously noted, different cellular network infrastructure components may behave differently, both in general and depending on the user device(s) with which they are communicating. For example, in some cases, certain radio features may be present for some infrastructure components (e.g., proprietary features, beyond those required by cellular protocol specifications, and implemented by a specific vendor) but not for others. Even for features which may be implemented across multiple infrastructure components, possible parameters of those features may have different limits for different ones of those multiple infrastructure components. As a further example, in some cases, device vendors may develop and test specific features for their devices which function well with (e.g., have passed interoperability testing (IOT) with) certain types or versions of cellular network infrastructure components but not others.

Accordingly, if techniques are provided for identifying specific features (e.g., vendor, type, version) of cellular network infrastructure components with which a user device (e.g., a UE 106 such as illustrated in and described with respect to FIGS. 1-3) is performing cellular communication, it may be possible for such a user device to modify its operation in a manner specific to the identified features of the cellular network infrastructure components. This may result in more effective and efficient communication overall.

FIG. 6 is a flowchart diagram illustrating such a method for identifying cellular network infrastructure equipment and modifying device behavior based on such identification. The method shown in FIG. 6 may be used in conjunction with any of the computer systems or devices shown in the above Figures, among other devices. In various embodiments, some of the elements of the method shown may be performed concurrently, in a different order than shown, or may be omitted. Additional elements may also be performed as desired. As shown, the method may operate as follows.

In 602, an indication of a network infrastructure identification technique to use may be received by a UE (such as UE 106 illustrated in and described with respect to FIGS. 1-3). The possible network infrastructure identification techniques indicated may include querying/sending request(s) for information to either one or more infrastructure vendors, or to a cellular network operator, or to a software and/or device vendor (e.g., a vendor of the UE which is receiving the indication and/or of operating system software which is executing on the UE which is receiving the indication), or to any of various other possible sources of network infrastructure identification information.

The indication may be received from a device vendor, which may be the vendor of the UE, as one possibility. The indication may be received dynamically and externally, e.g., by way of communication with a server provided by the device vendor (such as might be part of a wireless communication diagnostics system provided by the device vendor), or statically and internally, e.g., by way of initial configuration of the UE, among various possibilities.

In 604, it may be determined which of the possible network infrastructure identification techniques to utilize, based on the indication. As shown, if the indication indicates to query one or more infrastructure vendors and/or one or more network operators, the method may proceed to step 606.

In 606, the UE may send one or more requests or queries for infrastructure identification information to one or more infrastructure vendors and/or one or more network operators. Each participating infrastructure vendor may maintain deployment information regarding infrastructure equipment which they provided. For example, a participating infrastructure vendor might provide a server which maintains a database including information regarding geographic regions or areas (at any of various granularity levels) in which infrastructure equipment/components which they provided are currently deployed by one or more cellular network operators. Similarly, each participating network operator might provide a server which maintains a database including information regarding geographic regions or areas in which the network operator provides cellular service, and which infrastructure equipment/components are deployed in those geographic regions or areas. Such a database might further include details of the network component type/function, version (e.g., software and/or hardware version), individual component identification information (e.g., cell id), and/or any other information of the various infrastructure equipment/components deployed in the region in question.

The query or request may include any of various information, which the UE may provide to specify the information requested. For example, the UE may provide information which is usable to identify the network (e.g., PLMN) with which the UE is associated, a cell identifier of a cell to which the UE is currently attached (or to which the UE was recently attached, or which the UE has detected as being in the vicinity of the UE), a network-layer identifier such as location area or tracking area, and/or an indication of the current location of the UE, such as latitude/longitude coordinates (possibly also including an indication of the accuracy level of the coordinate measurement). Other information may be included alternatively or additionally if desired. The information included in the query/request may provide the infrastructure vendor or cellular network operator with sufficient information as to be able to service/respond to the query/request.

The query or request may take any of a variety of formats and be transmitted in any of a variety of ways. As one possibility, the query may be an hypertext transfer protocol secure (HTTPS) get request to a uniform resource locator (URL) associated with the infrastructure vendor in question. The request/query may be transmitted over the Internet or by any other connective path, to which access may be provided by way of cellular communication (e.g., by way of a cell with which the UE communicates), Wi-Fi communication (e.g., by way of a Wi-Fi access point with which the UE communicates), and/or any of various other communicative means. The query or request may be made by the telephony layer of the UE, if desired, or at another layer.

In 608, response(s) to the request(s) provided by the UE may be received from the infrastructure vendor(s) and/or network operator(s). The response(s) may include information which may facilitate determination/identification of cellular network infrastructure components in the vicinity (e.g., in a region including the current location) of the UE.

For example, a response from an infrastructure vendor may include an indication of whether or not any infrastructure equipment provided by that infrastructure vendor is deployed in the vicinity of the UE by the cellular network operator associated with the UE at that time (e.g., the PLMN to which the UE is connected), or possibly by any cellular network operator. If infrastructure equipment provided by that infrastructure vendor is deployed in the vicinity of the UE, the response may also indicate which network components (e.g., eNodeBs, MME, etc.) of the network in question are provided by the infrastructure vendor, and version information for those components. The response may also include an indication of a region for which the response is valid (e.g., the region for which the indicated network components are deployed by network in question). For example, the response may include geospatial (e.g., latitude/longitude) coordinates which form a polygon for which the response is valid.

As another example, a response from an network operator may include indications of which infrastructure equipment (e.g., with version information) is deployed in the vicinity of the UE by the network operator. The response may also include an indication of a region for which the response is valid.

If the cellular network in question is homogenous with respect to infrastructure vendor in the indicated region, it may not be necessary to identify which specific network components within the specified region are of the indicated type(s), since in such a case all components of a particular type may be as indicated in the response by a general indication of infrastructure component types provided in the region. However, if the cellular network in question is heterogeneous with respect to infrastructure vendor in the indicated region (i.e., includes network infrastructure components provided by multiple infrastructure vendors), information identifying specific network infrastructure components (e.g., by cell id or other component specific identifier, and/or by tracking area, location area, routing area, or other network specific identifier) as being provided by a particular vendor, and as being a specific component type and/or version, may be provided in order to facilitate differentiation by the UE of different infrastructure components deployed within the region.

Note additionally that if desired, the response may also include a timeout or time validity indicator. For example, if an infrastructure vendor expects/schedules certain infrastructure components to be updated at a specific time (e.g., in one month, two months, six months, or any other amount of time), the information provided in the response may only be expected to be valid until that time. Similarly, if a network operator has scheduled a deployment of additional equipment, or a replacement of existing equipment, at a specific time, the information provided in the response may only be expected to be valid until that time. Accordingly, providing such an indication as part of the response may enable a UE to more effectively determine when to re-query or update its information with respect to what infrastructure equipment is deployed in the region in question.

As noted above, the UE may transmit one such request, or may transmit multiple such requests. The number of requests transmitted may depend on the number of possible/participating infrastructure vendors and network operators for which infrastructure identification information is available, and/or possibly on the response(s) to the request(s) transmitted by the UE.

For example, if the UE sends a query to one infrastructure vendor, and receives a response indicating that infrastructure equipment provided by that infrastructure vendor is deployed in the vicinity of the UE and including information identifying the infrastructure equipment, this may be sufficient for the UE's purposes, in which case the UE may not send queries to any other infrastructure vendors at that time. If the response indicates that no infrastructure equipment provided by that infrastructure vendor is deployed in the vicinity of the UE, however, the UE may determine to query an additional infrastructure vendor. The UE may continue to perform such queries until a response which indicates that infrastructure equipment provided by a particular infrastructure vendor is deployed in the vicinity of the UE.

As previously noted, however, it is possible that infrastructure equipment provided by multiple infrastructure vendors may be deployed (e.g., underlaid or overlaid with each other) in a given region; that is, a cellular network may be heterogeneous with respect to infrastructure vendor. For example, a cellular network operator might deploy equipment provided by one vendor for a macro solution (e.g., macro eNBs and/or core network entities) and underlay equipment provided by a different vendor to provide/improve small cell coverage in the region. In such a case (and possibly other cases, if desired) the UE may send queries to multiple infrastructure vendors even if an initial query response indicates that infrastructure equipment provided by a particular infrastructure vendor is deployed in the vicinity of the UE, for example in order to ensure that the UE has obtained complete infrastructure equipment identification information for its current location.

In 610, some or all of the results of the request(s) may be provided to a vendor of the UE. For example, such information as is obtained may be provided to a server operated by the device vendor, such as a wireless diagnostics server.

As previously noted, a UE may proceed from decision 604 to perform steps 606-610 if it is indicated to query infrastructure vendor(s) and/or network operator(s) as a network infrastructure identification technique in step 602. It may be the case that the device vendor tasks a subset of devices provided by the device vendor to perform network infrastructure identification in that manner, and uses the information provided thereby to build its own database. Thus, the results of requests/queries to infrastructure vendors may be provided to the device vendor in order to facilitate building and maintaining of a database (e.g., an aggregated database) of infrastructure equipment vendor/product/software versions deployed in various regions by the device vendor.

As one possibility, such a database may be used (e.g., by the device vendor) to analyze behavior between specific device type/version and infrastructure equipment type/version combinations, for example in order to design custom features, to identify problems and design workarounds, and/or for any of various other reasons.

As a further (additional or alternative) possibility, as long as a sufficient number of devices are tasked with obtaining infrastructure equipment identification information directly from the infrastructure vendors and/or network operators to facilitate accurate maintenance of the device vendor's database, another (possibly larger) subset of devices provided by the device vendor may be instructed or configured to query or request infrastructure identification information from the device vendor as part of step 602. This may limit the potential load on the infrastructure vendor(s) and network operator(s) server(s), and at least in some instances (e.g., if aggregated data for multiple infrastructure vendors/cellular network operators may be obtained via a single query rather than multiple queries), may be more efficient for devices implementing this technique.

A UE which is so instructed may proceed from decision 604 to step 612, in which the UE may send a request or query for infrastructure identification information to the device vendor. The query or request may take any of a variety of formats and be transmitted in any of a variety of ways, and may be similar or different in format and transmission mechanism relative to queries or requests to infrastructure vendors/cellular network operators.

For example, the query may be an hypertext transfer protocol secure (HTTPS) get request to a uniform resource locator (URL) associated with the device vendor, and may include information indicating network, cell identifier, and/or latitude and longitude coordinates associated with the location of the UE sending the query.

In 614, a response to the request provided by the UE may be received from the device vendor. The response may include information which may facilitate determination/identification of cellular network infrastructure components in the vicinity (e.g., in a region including the current location) of the UE.

For example, the response may include an indication of which infrastructure vendors' equipment is deployed in the region in which the UE is located, including information identifying type and version of such equipment, either generally (e.g., in the case of a homogeneous deployment) or in a manner specific to some or all individual network components or component types (e.g., in the case of a heterogeneous deployment). The response may also include an indication of the region for which the response is valid (e.g., by providing coordinates forming a polygon, such as previously described, or in any other manner), and possibly an indication of the time validity of the response/a timeout indicator.

Note further that the information in the response may relate to a specific network (e.g., the PLMN to which the UE is attached and/or has indicated in the request/query), a plural subset of possible networks, or to all networks in the region in question, as desired. The response may further include information indicating to which network(s) the response applies, if desired, though at least in some cases, such information may be implicit in the response (e.g., if the response applies specifically to a PLMN indicated in the request/query by default) according to system configuration.

Once infrastructure identification information has been received by the UE (e.g., either from the device vendor in 614 or one or more infrastructure vendors in 608), in 616 the UE may identify infrastructure equipment with which the UE is performing cellular communication. In particular, based on the received response(s), the UE may be able to determine the infrastructure vendor, type/model, and/or version of specific individual components (e.g., eNB, MME, etc.) of the cellular network to which the UE is attached.

In 618, one or more behavior modifications and/or features may be selected for implementation based on the infrastructure equipment identification. Note that at least in some instances, such behavior modifications and/or features may be selected and implemented at a baseband layer of operation of the UE, but the query or queries may be made at a higher (e.g., telephony) layer. In such a case, the results of the query or queries may be provided (e.g., by way of a modem interface) to the baseband layer in order to facilitate utilization of the infrastructure equipment identification information to customize cellular software algorithms.

As previously noted, different infrastructure vendors' equipment, and different versions of each infrastructure vendor's equipment, may perform differently. For example, some infrastructure equipment may be configured to provide certain radio features (e.g., beyond standardized features) which other infrastructure equipment does not provide. As another possibility, some infrastructure equipment may be observed to cause a specific problem or have certain (e.g., feature parameter) limitations with a particular device hardware or software version (or in general) which may not be observed in interactions between that particular device hardware or software version and other infrastructure equipment. More generally, it may be the case that different sets of baseband parameters may result in optimal baseband operation depending on which of various possible infrastructure equipment arrangements are encountered by a UE.

Accordingly, the UE may be configured to modify its behavior in a manner specific to the particular equipment with which it is communicating at a given time, based in particular on the identified characteristics (e.g., vendor, type, version) of that equipment. This may include enabling radio features specific to the equipment, enabling workarounds for identified interoperability issues specific to the equipment, modification of baseband operation parameters, and/or any of various other modifications, as desired.

Once any such behavior modifications or equipment specific features have been selected, in 620 the UE may perform cellular communication using the selected behavior modification(s). For example, if the UE has identified the base station providing the serving cell of the UE as being provided by a specific vendor and being of a specific hardware model and/or running a particular software version, the UE may perform cellular communication with that base station in a manner which has been modified to account for the specific vendor, hardware model and/or software version of the base station.

Note that, at least in some instances, a UE may cache or store locally some or all of the infrastructure identification information it obtains. For example, the UE may store infrastructure identification information for a location or region in which it is most commonly located (e.g., a home location of the UE), and/or for one or more (e.g., depending on configuration) locations or regions in which the UE has most recently been located. Storing such information may allow a UE to identify infrastructure components with which it has not previously communicated and/or which it has previously explicitly identified, and thus select and implement behavior modifications based on the specific characteristics of those infrastructure components, without re-querying the infrastructure vendors', cellular network operators', and/or device vendor's servers if identification information for those components has already been obtained by the UE.

Thus, according to the method of FIG. 6, a UE may be able to identify specific cellular network infrastructure components with which the UE is communicating. This may potentially allow the UE to tailor its operation to the specific features and characteristics of those components.

Note additionally that while the method of FIG. 6 describes steps for obtaining and using cellular network infrastructure equipment identification information at a single instance, the method may be expanded and/or repeated as desired. For example, if a UE enters a new region for which it does not have sufficient information to identify the infrastructure equipment with which it is communicating, or if a UE's cached infrastructure identification information becomes invalid (e.g., due to expiration/timeout of the information), the UE may repeat part or all of the method of FIG. 6 to obtain such information for the new region and use that information to modify its behavior accordingly.

It should be noted that a given UE may obtain infrastructure identification information using different techniques in different instances of implementing the method of FIG. 6; for example, a UE might obtain infrastructure identification information from infrastructure vendors in one instance, and obtain infrastructure identification information from a device vendor in another instance. It should further be noted that selected and implemented behavior modifications may be different upon different instances of implementing the method of FIG. 6, e.g., since different infrastructure equipment may be identified in the different instances.

Exemplary Request/Response

As previously noted, a query/request for infrastructure equipment identification information, and a response to such a request, may take any of a variety of forms. One possible exemplary pseudo-request and pseudo-response are provided below for illustrative purposes.

Note that the following examples are provided as being illustrative of one possible manner in which infrastructure identification information requests and responses such as may be used in conjunction with the method of FIG. 6 may be formatted, and are not intended to be limiting to the disclosure as a whole. Numerous variations and alternatives to the details provided herein below are possible and should be considered within the scope of the disclosure.

The pseudo-request may be as follows:

```
{
    "cellIdentifier" : {
        "plmnIdentity" : {
            "mnc" : 111,
            "mcc" : 310
        },
        "lac" : 56957,
        "cellId" : 5021,
        "cellGlobalIdCDMA2000": {
            "cellGlobalIdHRPD" : 456,
            "cellGlobalId1xRTT" : 123
        }
    },
    "geoLocation" : {
        "lat" : 37.301580,
        "long" : -122.029670,
        "accuracy" : 0.5
    }
}
```

As shown, the request may include PLMN identifying information (e.g., mobile network code (MNC) and mobile country code (MCC)), camped cell identifier information (e.g., location area code (LAC), cellID, cellGlobalIdEUTRA/cellGlobalIdUTRA/cellGlobalIdGERAN/cellGlobalIdCDMA2000/cellGlobalIdHRPD/cellGlobalId1x RTT), and geographic location information (e.g., latitude/longitude coordinates with estimated accuracy).

The pseudo-response may be as follows:

```
{
    "isLocationServed" : true,
    "ttl": 60,
    "vendorInformation" : [
        { "versionId" : "v12.2", "elementType" : "eNodeB" },
        { "versionId" : "Rel.2012", "elementType" : "MME" }
    ],
    "polygon" : [
        { "lat": 37.301580, "long": -122.029670 },
        { "lat": 37.301580, "long": -122.029670 },
        { "lat": 37.301580, "long": -122.029670 },
        { "lat": 37.301580, "long": -122.029670 },
        { "lat": 37.301580, "long": -122.029670 },
    ],
    "validNetworkIds": {
        "plmnIdentity": { "mcc": 310, "mnc": 410 },
        "cellIds": [4275, 3017455, 5119181, 207000],
        "tac": [4275, 3017455, 5119181, 207000],
        "lac": [4275, 3017455, 5119181, 207000],
        "rac": [4275, 3017455, 5119181, 207000]
    }
}
```

As shown, the response may include an indication of whether or not the infrastructure vendor's equipment is deployed in the location in question (e.g., a Boolean true/false response), a time validity indicator (e.g., a numerical indicator with a value in days, weeks, seconds, or any other measure of time), information indicating specific equipment types and versions of the infrastructure vendor's equipment deployed in the location (e.g., element type(s) and version(s)), location information indicating a region for which the response is valid (e.g., latitude/longitude coordinates bounding/forming corners of a polygon representing the region), and an indication of to which specific cellular network(s) and to which cells or other network elements the response applies (e.g., MNC, MCC, cellIDs, tracking area code(s) (TAC(s)), LAC(s), routing area code(s) (RAC(s))).

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a wireless user equipment (UE) device, the method comprising:
   by the UE:
   sending a first query to a first server, wherein the first query provides location information for the UE indicating that the UE is at a first location, wherein the first query comprises a request for information identifying characteristics of cellular network infrastructure equipment in a region comprising the first location;
   receiving a first response to the first query from the first server, wherein the first response comprises information identifying characteristics of cellular network infrastructure equipment in a first region comprising the first location, wherein the first response further comprises information identifying the first region;
   identifying at least two of vendor, type, model, or version of cellular network infrastructure equipment in the first region based at least in part on the first response;
   selecting at least one behavior modification to implement when performing cellular communication with cellular network infrastructure equipment in the first region based at least in part on identifying at least two of vendor, type, model, or version of cellular network infrastructure equipment in the first region, wherein the at least one behavior modification comprises enabling workarounds for at least one identified interoperability issue specific to the cellular network infrastructure equipment; and
   performing cellular communication with cellular network infrastructure equipment in the first region, wherein the selected at least one behavior modification is implemented while performing the cellular communication with cellular network infrastructure equipment in the first region.

2. The method of claim 1,
   wherein the first server is operated by a cellular network infrastructure equipment vendor,
   wherein the first response comprises information indicating whether or not cellular network infrastructure equipment provided by the cellular network infrastructure equipment vendor is deployed in the first region,
   wherein first response comprises information indicating type and version information for any cellular network infrastructure equipment provided by the cellular network infrastructure equipment vendor deployed in the first region.

3. The method of claim 2, further comprising:
   sending a respective query to each of one or more additional cellular network infrastructure equipment vendors; and
   receiving a respective response from each of the one or more additional cellular network infrastructure equipment vendors,
   wherein identifying at least two of vendor, type, model, or version of cellular network infrastructure equipment in the first region and selecting at least one behavior modification to implement when performing cellular communication with cellular network infrastructure equipment in the first region are performed also based on the respective response from each of the one or more additional cellular network infrastructure equipment vendors.

4. The method of claim 1, wherein the first server is operated by a cellular network operator,
   wherein the first response comprises information indicating vendor, type and version information for cellular network infrastructure equipment deployed in the first region by the cellular network operator.

5. The method of claim 1, wherein the first server is operated by a cellular network infrastructure equipment vendor or a cellular network operator, wherein the method further comprises:
   providing results of the first query to a server operated by a vendor of the UE.

6. The method of claim 1,
   wherein the first server is operated by a vendor of the UE, wherein the first response comprises information identifying vendor, type, model, and version of cellular network infrastructure equipment in the first region.

7. The method of claim 1,
   wherein the first response further comprises information indicating a time validity of the first response.

8. The method of claim 1, further comprising:
   detecting that the UE is in a second location which is not in the first region;
   sending a second query to the first server, wherein the second query provides location information for the UE, wherein the second query comprises a request for information identifying characteristics of cellular network infrastructure equipment in a region comprising the second location;

receiving a second response to the second query from the first server, wherein the second response comprises information identifying characteristics of cellular network infrastructure equipment in a second region comprising the second location, wherein the second response further comprises information identifying the second region;

identifying at least two of vendor, type, model, or version of cellular network infrastructure equipment in the second region based at least in part on the second response;

selecting at least one behavior modification to implement when performing cellular communication with cellular network infrastructure equipment in the second region based at least in part on identifying at least two of vendor, type, model, or version of cellular network infrastructure equipment in the second region; and performing cellular communication with cellular network infrastructure equipment in the second region, wherein the selected at least one behavior modification is implemented while performing the cellular communication with cellular network infrastructure equipment in the second region.

9. The method of claim 8, wherein the at least one behavior modification to implement when performing cellular communication with cellular network infrastructure equipment in the second region is different than the at least one behavior modification to implement when performing cellular communication with cellular network infrastructure equipment in the first region.

10. A wireless user equipment (UE) device, comprising:
a radio; and
a processing element operably coupled to the radio,
wherein the radio and the processing element are configured to:
   transmit one or more requests for infrastructure identification information to one or more servers, wherein each respective request indicates a current location of the UE;
   receive a respective response to each corresponding respective request, wherein each respective response comprises infrastructure identification information for the current location indicated in the corresponding respective request;
   determine two or more of infrastructure equipment vendor, type, model, or version of infrastructure equipment with which the UE performs cellular communication based on the infrastructure identification information; and
   modify UE behavior in a manner specific to the determined two or more of infrastructure equipment vendor, type, model, or version when performing cellular communication with infrastructure equipment of the determined two or more of infrastructure equipment vendor, type, model or version, wherein modifying UE behavior comprises enabling workarounds for at least one identified interoperability issue specific to the cellular network infrastructure equipment.

11. The UE of claim 10, wherein the one or more servers comprise one or more infrastructure vendors' or cellular network operators' servers, wherein the radio and the processing element are further configured to:
provide information received from the one or more infrastructure vendors' or cellular network operators' servers to a system operated by a vendor of the UE.

12. The UE of claim 10,
wherein the one or more servers comprise one or more servers operated by a vendor of the UE.

13. The UE of claim 10, wherein the radio and the processing element are further configured to:
   cache the infrastructure identification information received in each respective response to each corresponding respective request.

14. A non-transitory computer accessible memory medium comprising program instructions which, when executed at a wireless user equipment (UE) device, cause the UE to:
   transmit one or more requests for cellular network infrastructure equipment identification information, wherein each respective request indicates a current location of the UE and a cell ID of a cell on which the UE is camped;
   receive a respective response to each corresponding respective request, wherein each respective response comprises cellular network infrastructure equipment identification information for the current location indicated in the corresponding respective query, wherein the cellular network infrastructure equipment identification information supports identification of at least two of vendor, type, model, or version of cellular network infrastructure equipment which provides the cell on which the UE is camped;
   identify at least two of vendor, type, model, or version of the cellular network infrastructure equipment which provides the cell on which the UE is camped based on responses to the one or more requests;
   select one or more features for implementation while communicating with the cellular network infrastructure equipment which provides the cell on which the UE is camped based on the identified vendor, type, model, and/or version of the cellular network infrastructure equipment which provides the cell on which the UE is camped, wherein the one or more features comprise enabling workarounds for at least one identified interoperability issue specific to the cellular network infrastructure equipment; and
   perform cellular communications with the cellular network infrastructure equipment which provides the cell on which the UE is camped using the selected one or more features.

15. The memory medium of claim 14, wherein the one or more requests are provided to one or more of:
   one or more cellular network infrastructure equipment vendors;
   one or more cellular network operators; or
   a vendor of the UE.

16. The memory medium of claim 15, wherein when executed, the program instructions further cause the UE to:
   receive an indication of whether to provide the one or more requests to the one or more cellular network infrastructure equipment vendors, the one or more cellular network operators, or the vendor of the UE;
   transmit the one or more requests to either the one or more cellular network infrastructure equipment vendors, the one or more cellular network operators, or the vendor of the UE based on the indication; and
   provide results of the one or more requests to the vendor of the UE if the indication indicates to provide the one or more requests to the one or more cellular network infrastructure equipment vendors or the one or more cellular network operators.

17. The memory medium of claim 14,
wherein each respective response comprises an indication of an amount of time for which the respective response is valid.

18. The memory medium of claim 14,
wherein each respective response comprises cellular network infrastructure equipment identification information for a respective region comprising the current location of the UE, wherein each respective response further comprises information defining the respective region for which the respective response is valid.

19. The memory medium of claim 18,
wherein the information defining the respective region for which the respective response is valid comprises polygon information indicating boundaries of a geographic region for which the respective response is valid.

* * * * *